United States Patent
Park

(10) Patent No.: US 9,587,508 B2
(45) Date of Patent: Mar. 7, 2017

(54) GENERATOR-TYPE PRESSURE RELIEF DEVICE FOR WATER SUPPLY AND DRAINAGE PIPES

(71) Applicant: Jong Hum Park, Suwon-si (KR)

(72) Inventor: Jong Hum Park, Suwon-si (KR)

(*) Notice: Subject to any disclaimer, the term of this patent is extended or adjusted under 35 U.S.C. 154(b) by 0 days.

(21) Appl. No.: 14/372,669

(22) PCT Filed: Apr. 12, 2013

(86) PCT No.: PCT/KR2013/003112
§ 371 (c)(1),
(2) Date: Jul. 16, 2014

(87) PCT Pub. No.: WO2013/172555
PCT Pub. Date: Nov. 21, 2013

(65) Prior Publication Data
US 2014/0346776 A1    Nov. 27, 2014

(30) Foreign Application Priority Data

May 14, 2012  (KR) .................. 10-2012-0050983

(51) Int. Cl.
*F03B 13/00*      (2006.01)
*F01D 15/10*      (2006.01)
(Continued)

(52) U.S. Cl.
CPC ............. *F01D 15/10* (2013.01); *C25F 1/00* (2013.01); *F01D 17/08* (2013.01); *F01D 17/14* (2013.01);
(Continued)

(58) Field of Classification Search
CPC ........................................... F03B 17/06
(Continued)

(56) References Cited

U.S. PATENT DOCUMENTS 3,063,460 A * 11/1962 Krauss .................. 415/20
4,122,381 A * 10/1978 Sturm .................... 320/128
(Continued)

FOREIGN PATENT DOCUMENTS

JP    2002-242813 A    8/2002
JP    2004-360479 A    12/2004
(Continued)

OTHER PUBLICATIONS

International Searching Authority International Search Report for PCT/KR2013/003112 dated Jun. 14, 2013.

*Primary Examiner* — Joseph Waks
(74) *Attorney, Agent, or Firm* — Sughrue Mion, PLLC

(57) ABSTRACT

A generator-type pressure relief device includes: a housing; a propeller disposed in the housing; a shaft fixed to the center of rotation of the propeller; a generator unit that generates electricity by receiving rotational torque from the shaft; an electricity storage unit that stores electricity generated by the generator unit; an electronic brake operated by an electric signal supplied from the outside to suppress the axial rotation of the shaft; a control unit that sends an electric signal to the electronic brake to control the operation of the electronic brake; and a water pressure sensor provided in the water supply pipe or the water drainage pipe or the housing so as to transfer water pressure information on the water to the control unit, and which allows the control unit to control the electronic brake.

3 Claims, 3 Drawing Sheets

(51) Int. Cl.
  *F03B 15/08* (2006.01)
  *C25F 1/00* (2006.01)
  *F01D 17/08* (2006.01)
  *F01D 17/14* (2006.01)
(52) U.S. Cl.
  CPC .............. *F03B 13/00* (2013.01); *F03B 15/08* (2013.01); *F05B 2220/20* (2013.01); *F05B 2270/301* (2013.01); *Y02E 10/226* (2013.01); *Y02E 10/28* (2013.01)
(58) Field of Classification Search
  USPC .................................................... 290/54, 43
  See application file for complete search history.

(56) References Cited

U.S. PATENT DOCUMENTS

| | | | | |
|---|---|---|---|---|
| 4,246,753 | A * | 1/1981 | Redmond | 60/398 |
| 4,352,025 | A * | 9/1982 | Troyen | 290/54 |
| 4,496,845 | A * | 1/1985 | Ensign et al. | 290/43 |
| 5,043,592 | A * | 8/1991 | Hochstrasser | 290/52 |
| 6,824,347 | B2 * | 11/2004 | Maloney | 415/1 |
| 7,501,712 | B2 * | 3/2009 | Bolyard | 290/43 |
| 7,768,146 | B2 * | 8/2010 | Balzano | 290/54 |
| 2005/0173261 | A1 * | 8/2005 | Tholen | 205/742 |

FOREIGN PATENT DOCUMENTS

| | | |
|---|---|---|
| JP | 2004-360482 A | 12/2004 |
| KR | 10-2011-0014967 A | 2/2011 |

* cited by examiner

GENERATOR-TYPE PRESSURE RELIEF DEVICE FOR WATER SUPPLY AND DRAINAGE PIPES

CROSS REFERENCE TO RELATED APPLICATION

This application is a National Stage of International Application No. PCT/KR2013/003112 filed Apr. 12, 2013, claiming priority based Korean Patent Application No. 10-2012-0050983 filed May 14, 2012, the contents of all of which are incorporated herein by reference in their entirety.

TECHNICAL FIELD

The present invention relates to a generator-type pressure relief device for water supply and drainage pipes.

BACKGROUND ART

Water in water supply and drainage pipe paths is pressurized to a desired pressure in a pressurization plant and then fed through water supply and drainage pipes to a destination where water pressure is inefficient. Pressure which is applied to the water in the pressurization plant is determined considering a distance between the pressurization plant and consumer, diameter or conditions of the water supply pipe etc. For example, in a case where a region to be supplied with the water is quite remote from the pressurization plant or includes hilly areas, the pressure applied to the water is relatively higher than a different case.

Meanwhile, when for example higher water pressure than necessary occurs in the water supply and drainage pipes, the water supply and drainage pipes and consumer-side water supply and drainage facilities may be damaged; therefore, a pressure relief valve for lowering the water pressure is almost essentially installed. In a case where the water pressure is higher than necessary, the pressure relief valve operates to allow the water pressure on a downstream side of the pressure relief valve to be kept almost constant, thereby preventing burst or water leak of the water supply pipe etc. for example.

The pressure relief valve has many types; for example, the pressure relief valve has been developed of a type which can generate electricity by using the pressure of water passing through the water supply and drainage pipes.

FIG. 1 is a view schematically showing a conventional pressure relief device to which a generation system is applied.

The pressure relief device illustrated in FIG. 1 includes a rotor (17) which is rotatable in a water supply pipe (11) with a shaft (21) as a rotational shaft; guide slopes (13, 15) fixed on the upstream and downstream sides of the rotor (17), respectively; and a generator(not illustrated) which generates electricity by receiving rotational torque from the rotor (17).

The rotor (17) has a plurality of blades (19) for rotating the shaft (21) by receiving the water pressure. The blades (19) serve to rotate the rotor (17) by receiving kinetic energy of the water passing through the water supply pipe (11).

The shaft (21) extends with its ends to the outside of the water supply pipe (11) to drive the generator installed outside the water supply pipe (11), thereby enabling the generator to generate the electricity.

Furthermore, the guide slopes (13, 15) are a protruding part fixed to an inner wall surface of the rotor (17) and guide streamlines of the water in a direction indicated by arrow "a" to allow the water to pass through a lower side of the rotor (17) as seen in the figure.

The reason why the pressure relief device having the above configuration reduces the water pressure is that the pressure relief device itself obstructs water flow by reducing sectional area of flow in the water pipe (11), thereby acting as an obstructor which lowers flow speed.

However, the conventional pressure relief device having the above configuration has a disadvantage that it cannot adjust the degree of pressure relief. That is, it cannot drop the water pressure downstream of the rotor (17) as desired. This is because the rotor (17) merely generates the electricity while rotating by receiving the kinetic energy of the water and, once starting to rotate, cannot act as a resistance body in a flow field any more.

Furthermore, the conventional pressure relief device has a structure where the water easily passes the rotor (17) while rotating the rotor due to actions of the guide slopes (13, 15); therefore, function of the rotor as the resistance body is further lowered.

In addition, the conventional pressure relief device described above does not have so good electricity generation efficiency. As illustrated, though the guide slopes (13, 15) guide the streamline of water in the direction indicated by arrow "a", 100% of the water does not pass through the lower side of the rotor (17), and part of the water passes in a direction indicated by arrow "b" opposite to a rotational direction of the rotor (17), thereby impeding the rotation of the rotor.

SUMMARY OF THE INVENTION

Technical Problem

The present invention was made in order to solve the above problems, and its object is to provide a generator-type pressure relief device for water supply and drainage pipes which is capable of easily adjusting the degree of pressure reduction by itself, has reliable pressure reduction performance because an electric water control valve is secondarily provided, and has high electricity generation efficiency because almost all of the kinetic energy of the water is used to generate the electricity, and particularly, applies part of the generated electricity to the water to activate electronic energy of molecules of the water, thereby preventing occurrence of scale in pipes and also occurrence of red water.

Solution to the Problem

A generator-type pressure relief device for water supply and drainage pipes of the present invention for achieving the object reduces pressure of water flowing through a water supply pipe or a water drainage pipe and also generates electricity by using the water pressure and comprises: a housing through which the water passing through the water supply pipe or the water drainage pipe passes; a propeller which is disposed in the housing and rotatable by the water pressure; a shaft which is fixed to a rotational center of the propeller and axially rotates when the propeller rotates; a bearing and a frame which axially rotatably support the shaft; a generator unit which generates the electricity by receiving rotational torque from the shaft; an electricity storage unit which stores the electricity generated by the generator unit; an electronic brake which is operated by electric signal supplied from the outside to suppresses an axial rotation of the shaft and which is submerged in the water and disposed in the housing while being supported by the frame; a control unit which sends an electric signal to the electronic brake to control operation of the electronic brake; a water pressure sensor which is provided in the water supply pipe or the water drainage pipe or the housing and which transmits information on the water pressure to the control unit to enable the control unit to control the electronic brake; a plurality of electrodes which are mounted in the housing and suppresses occurrence of scale in the water supply pipe or the water drainage pipe and prevents occurrence of red water and which are connected with the electricity storage unit to be supplied with electric current from the electricity storage unit and apply the supplied electric current to the water to activate electronic energy of molecules of the water passing through the housing; and a secondary pressure relief unit which is disposed on a upstream side or downstream side of the propeller and is opened or closed depending on the magnitude of the pressure of the water passing through the housing and which reduces the pressure of the water flowing toward the propeller or the pressure of the water which has passed the propeller, the secondary pressure relief unit comprising: a ring-shaped support member fixed on an inner wall surface of the housing; a cone disc for opening and closing the support member; a hollow sliding shaft fixed at a central portion of the cone disc; a disc support shaft which is inserted in the sliding shaft and guides movement of the sliding shaft; a fixing frame for fixing the disc support shaft; and a spring positioned between the cone disc and the fixing frame.

Furthermore, the housing is a pipe-shaped member having the same inner diameter as that of the water supply pipe or the water drainage pipe, and both ends of the housing are fixed to the water supply pipe or the water drainage pipe.

In addition, the shaft is provided on a central axis of the housing and the shaft and the generator unit are power-connected through a first bevel gear and a second bevel gear meshing with each other.

Effects of the Invention

The generator-type pressure relief device for water supply and drainage pipes of the present invention configured as above is capable of easily adjusting the degree of pressure reduction by itself, has reliable pressure reduction performance because an electric water control valve is secondarily provided, and has high electricity generation efficiency because almost all of the kinetic energy of the water is used to generate the electricity, and particularly, applies part of the generated electricity to the water to activate electronic energy of molecules of the water, thereby preventing occurrence of scale in pipes and also occurrence of red water.

BEST MODES FOR CARRYING OUT THE INVENTION

Hereinafter, a preferred embodiment according to the present invention will be described in more detail with reference to the attached drawings.

Figure 1:
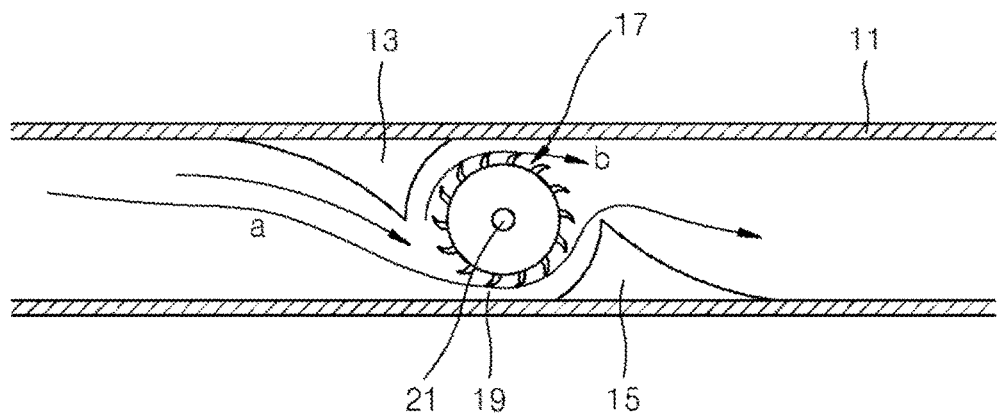
FIG. 1 is a view schematically showing a conventional pressure relief device which is equipped with a generation system.
Figure 2:
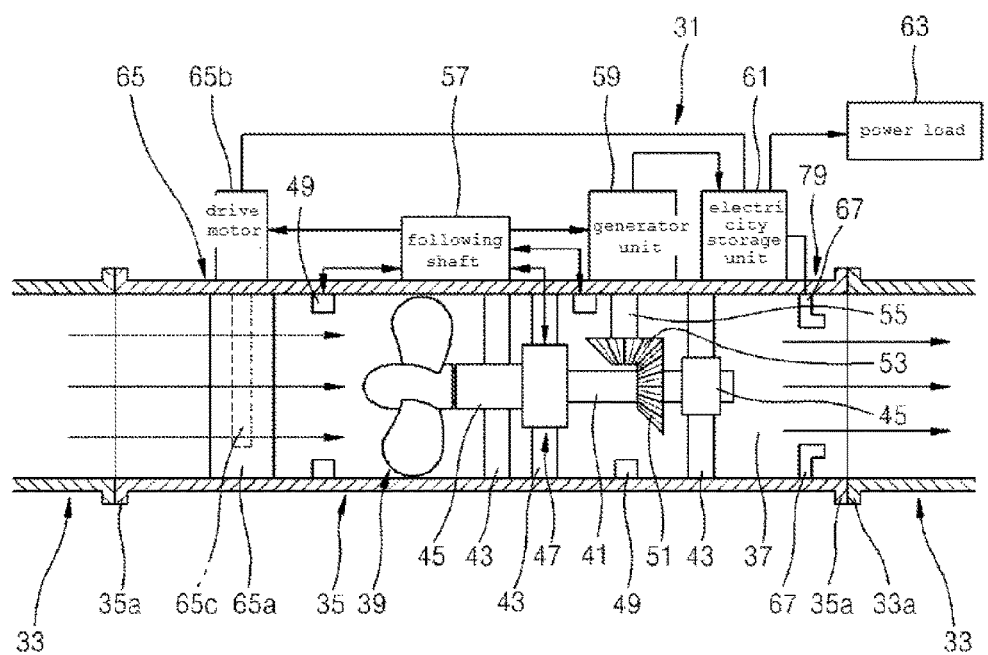
FIG. 2 is a view illustrated for describing a structure of generator-type pressure relief device for water supply and drainage pipes according to an embodiment of the present invention.

FIG. 2 is a view for describing a structure of generator-type pressure relief device for water supply and drainage pipes according to an embodiment of the present invention.

As illustrated, the generator-type pressure relief device for water supply and drainage pipes (31) according to the present embodiment includes: a pipe-shaped housing (35) which has a constant inner diameter and axially extends; a propeller (39) which is disposed in the housing (35); a shaft (41) which is fixed to a rotational center of the propeller (39) and extends in a longitudinal direction of the housing (35); an electronic brake (47) which suppresses a axial rotation of the shaft (41); a bearing (45) and a frame (43) which axially rotatably support the shaft (41); a plurality of water pressure sensors (49) which senses the water pressure; a generator unit (59) which generates electricity by receiving rotational torque of the shaft (41); an electricity storage unit (61) which stores the electricity generated by the generator unit (59); a control unit (57) which controls the electronic brake (47) etc.; an electric water control valve (65) which is provided on a upstream side of the propeller (39); and a hydrotreater (79) which receives electric power from the electricity storage unit (61) to apply the electric power to the water, thereby activating electronic energy of the water molecules.

Firstly, the housing (35) is a pipe-shaped member of a constant diameter with flange parts (35a) at both ends thereof and is coupled with flange parts (33a) of the water supply and drainage pipes (33) while butting against the flange parts of the pipes. The water supply and drainage pipes (33) are a term embracing a water supply pipe and a water drainage pipe. The inner diameter of the housing (35) is the same as that of the water supply and drainage pipes (33).

The shaft (41) is a shaft which is axially rotatably supported in its position by the bearing (45) and the frame (43), and is positioned on a central axis of the housing (35). Therefore, the distance from the shaft (41) to the inner circumferential surface of the housing (35) is constant.

The propeller (39) provided at a tip portion of the shaft (41) rotates by receiving kinetic energy of the water and thus axially rotates the shaft (41). As material for the propeller (39), for example, stainless steel, synthetic resin or other metal may be used The electronic brake (47) disposed on the shaft (41) is operated by control signal of the control unit (57) to suppress the rotation of the shaft (41) or stop the shaft, and is fixed in the housing (35) by means of the frame (43). According to circumstances, the electronic brake (47) may be fixed to a side portion of a housing of the bearing (45) without using the frame (43).

Anyway, the electronic brake (47) controls the rotation of the shaft (41) while supported by the frame (43). That is, the electronic brake adjusts the rotational speed of the shaft (41) or completely fixes the shaft and thus immobilizes the same or allows the shaft (41) to freely rotate without restraining the shaft.

The electronic brake (47) per se is known and is operated by an electrical signal transmitted from the control unit (57). In addition, the electronic brake (47) is submerged in the water and thus sealably enclosed within a separate sealing case (not illustrated).

Furthermore, a first bevel gear (51) is fixed on the shaft (41). The first bevel gear (51) meshes with a second bevel gear (53) and thus serves to transmit the rotational torque of the shaft (41) to the second bevel gear (53). The second bevel gear (51) is a gear connected to the generator unit (59) through a following shaft (55), and transmits a rotational torque to the generator unit (59), thereby enabling the generator unit to generate the electrical power.

Eventually, the electrical power is generated by the propeller (39) being rotated by the water passing through the inside of the housing (35).

The generator unit (59) is an ordinary generator and receives the rotational torque of the shaft (41) through the following shaft (55) to generates the electrical power, while being fixed on the outside of the housing (35).

Furthermore, the electricity storage unit (61) is disposed next to the generator unit (59) and receives and stores the electrical power generated by the generator unit (59). The electrical power stored in the electricity storage unit (61) is transmitted to an external power load (63), the electric water control valve (65) or the hydrotreater (79).

The power load (63) includes various electric devices or light bulbs installed in the vicinity of the water supply and drainage pipes (33) on the ground. For example, it may be used as a power source for neighboring streetlamps or lifting device of fire hydrant (installed in jurisdiction area).

The electric water control valve (65) includes a valve body (65a) disposed in the housing (35) and a drive motor (65b) for opening and closing a door (65c) of the valve body (65a). The types of the electric water control valve may be variously changed. This means that any type of the electric water control valve can be applied to the pressure relief device according to the present embodiment as long as the valve can open and close a flow path (37) of the housing (35) by using a power of the drive motor (65b).

The electric water control valve (65) has an secondary function of pressure relief and is operated by the control unit (57). According to circumstances, the electric water control valve (65) may be completely opened or partially opened.

When the electric water control valve (65) is partially opened, the water hits the propeller (39) with the pressure thereof first reduced. When the electric water control valve (65) is completely opened, the water flowing into the housing (35) hits the propeller (39) without any particular change of pressure.

Meanwhile, a plurality of electrodes (67) are disposed in the housing (35). The electrodes (67) are hydrotreater and serve to apply electric current supplied from the electricity storage unit (61) to the water passing through the housing. As known from known fact, when the electric current is applied to the water, the electronic energy of water molecules is activated and thus occurrence of scale and red water can be prevented. The red water means rust water (such a water treatment technique is referred to as hydrotreatment).

For example, when direct electric current of 1.5 V to 3 V is applied to the water, ionic structures of the water molecules and various minerals in the water are changed into anion, whereby generation of the scale is suppressed and the water becomes soft and also generation of bacteria is suppressed.

Figure 3:
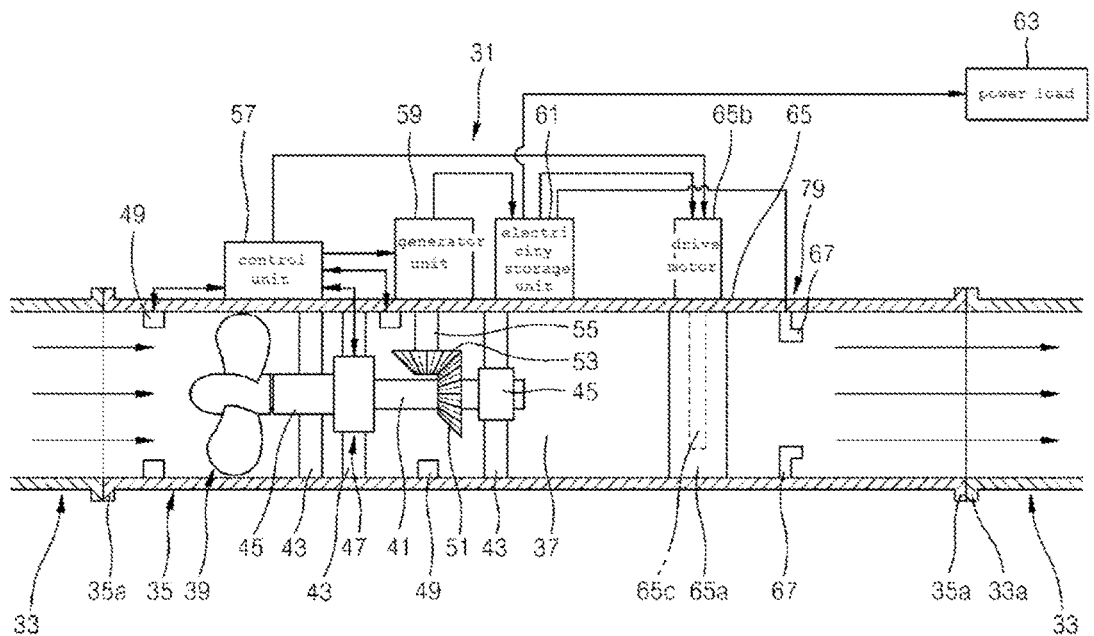
FIG. 3 is a view illustrating a generator-type pressure relief device for water supply and drainage pipes according to another embodiment of the present invention.

FIG. 3 is a view illustrating a generator-type pressure relief device for water supply and drainage pipes according to another embodiment of the present invention.

The same reference numerals as the reference numerals described above designate the same members having the same functions.

As illustrated, the electric water control valve (65) may be disposed on a downstream side of the propeller (39). Therefore, the water with the pressure thereof first reduced by the propeller (39) can be reduced once more in pressure by the electric water control valve (65). Of course, whether or not the water pressure is first reduced by the propeller (39) is determined according to circumstances; therefore, the water pressure is not reduced by the propeller (39) and only the electric water control valve (65) may be used in reducing of the water pressure.

Basically, an effect of pressure relief in the generator-type pressure relief device according to the present embodiment is allowed because rotation of the propeller (39) can be actively controlled in the flow field where the water flows. That is, the effect of pressure relief is allowed because, by using the electronic brake (47), adjustment can be made such that in the flow field where the water flows, the propeller (39) is immobilized so as not to rotate or slowly rotates or is pushed by the water to rotate without resisting the water pressure.

When the propeller (39) is immobilized, the propeller (39) acts as an obstructor which obstructs flow of the water passing the housing (35). That is, the water flowing into the housing (35) is blocked first by the propeller (35) to be decreased in speed and then passes between blades in such a state, whereby the speed and pressure of the water is reduced.

According to the law of energy conservation, the kinetic energy which the water lost passing the propeller (39) is first transmitted to the propeller (39) itself and the frame (43) etc.

In the above state, if the propeller (39) starts to rotate by slowly releasing the electronic brake (47), the water more well passes the propeller (39) (than when the propeller (39) is stopped). Reduction of the kinetic energy of the water is relatively small. That is, drop of the water pressure decreases.

Furthermore, when any restraining force is not applied to the propeller (39), the propeller (39) is pushed to rotate without any particular resistance by receiving the kinetic energy of the water, and thus the pressure of the water which has passed the propeller (39) is not almost lowered.

In theory, if the water is fed toward the downstream side of the propeller (39) by forcingly rotating the propeller (39), the water pressure on the downstream side of the propeller (39) would be higher than the water pressure on the upstream side of the propeller. Eventually, by controlling the rotational speed of the propeller (39) through the electronic brake (47), the water pressure on the downstream side of the propeller (39) can be linearly adjusted.

Figure 4:
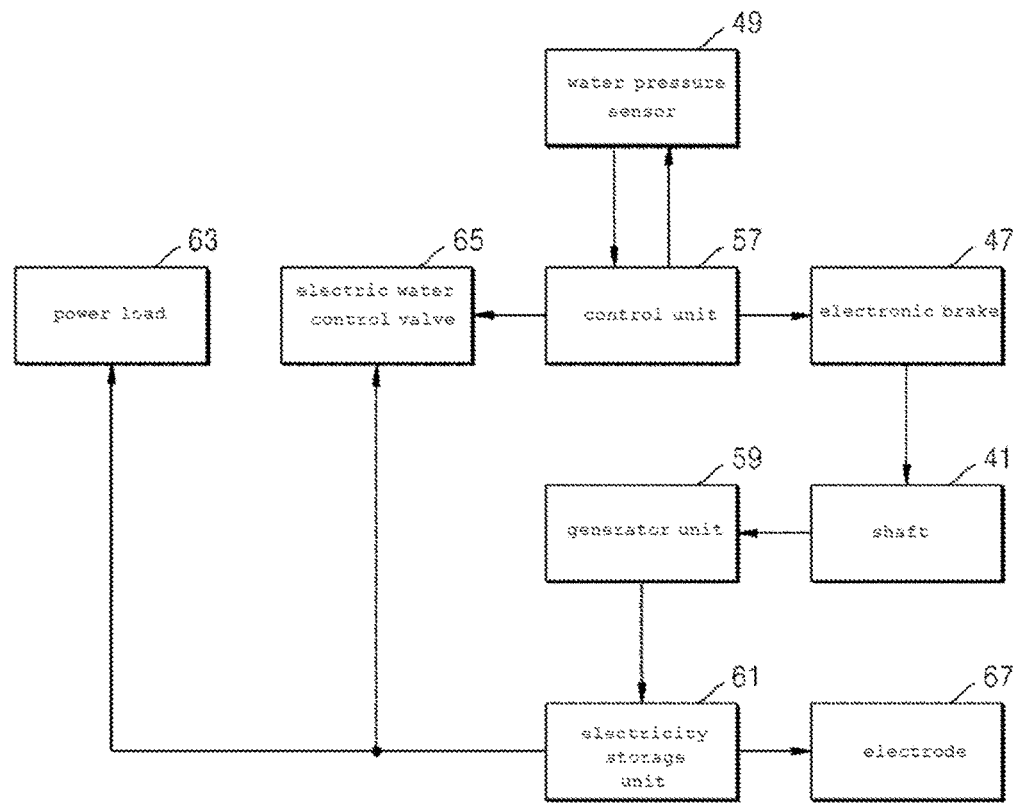
FIG. 4 is a block diagram for describing operation of the generator-type pressure relief device illustrated in FIGS. 2 and 3.

FIG. 4 is a block diagram for describing operation of the generator-type pressure relief device illustrated in FIGS. 2 and 3.

Basically, the propeller (39) is set to rotate in accordance with recommended water pressure for the water supply of relevant area. That is, the propeller (39) rotates in a constant speed and axially rotates the shaft (41) as long as abnormal rise of the water pressure does not cause operation of the electronic brake (47). Furthermore, the electric water control valve (65) is completely opened in a normal state in which the water pressure does not rise.

As described above, the shaft (41) continues to axially rotate while the water pressure is kept normal. As the shaft (41) axially rotates, the rotational torque of the shaft (41) is transmitted to the generator unit (59) through the first and second bevel gears (51, 53) and the following shaft (55).

The electric power generated by the generator unit (59) is transmitted to and stored first in the electricity storage unit (61). The electric power stored in the electricity storage unit (61) may be transmitted to and used by a neighboring power load (63). To this end, a separate transformer or converter etc. may be added. Furthermore, according to circumstances, the electricity generated by the generator unit (59) may be transmitted and sold.

Anyway, in a normal operation state, if the water pressure in the housing (35) increases due to an abnormal reason, the water pressure sensor (49) immediately senses the fact and informs the control unit (57) of it.

The control unit (57) receives information on the water pressure transmitted from the water pressure sensor (49), and activates the electronic brake (47) to slowly rotate the shaft (41) if the water pressure deviates from an allowable value. As the rotational speed of the shaft (41) is slowed, the speed of the propeller (39) is also slowed, and the pressure of the water which has passed the propeller (39) is lowered (according to the above theory). the water pressure in the housing is always checked through the water pressure sensor (49).

If the water pressure does not drop to within the allowable value in spite of performing of the above process, the shaft (41) is caused to slowly rotate or even stop by the electronic brake (47).

If the water pressure is still high although the shaft (41) is stopped, the electric water control valve (65) is activated by the control unit (57). That is, the electric power of the electricity storage unit (61) is transmitted to the drive motor (65*b*) to close the door (65*c*) of the electric water control valve (65). As the door (65*c*) is partially closed, the pressure of the water passing through the housing (35) is certainly reduced.

In the above state, if the pressure of the water flowing into the housing (35) falls within a normal range, the electric water control valve (65) is opened again, and the shaft (41) is allowed to normally operate by releasing of the electronic brake (47).

As described above, also while the water pressure in the housing (35) is adjusted, the hydrotreater (79) continues to operate, whereby the electricity, of course, continues to be applied to the electrodes (67) from the electricity storage unit (61).

Figure 5:
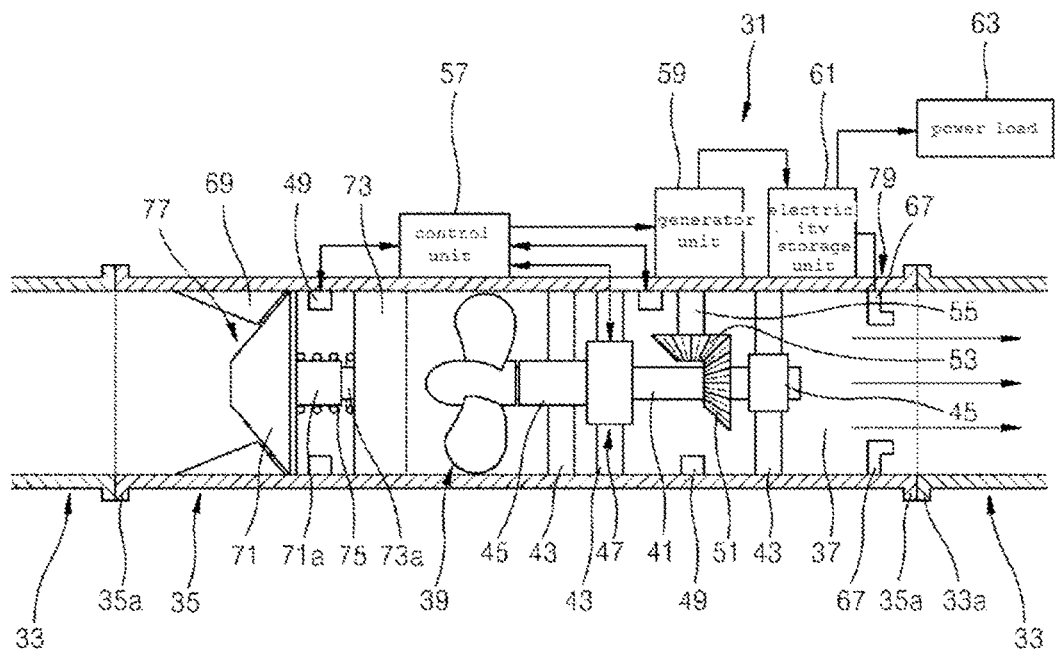
FIG. 5 is a view illustrating a generator-type pressure relief device for water supply and drainage pipes according to yet another embodiment of the present invention.

FIG. 5 is a view illustrating a generator-type pressure relief device for water supply and drainage pipes according to yet another embodiment of the present invention.

Referring to the figure, it can be seen that an secondary pressure relief unit (77) is disposed on the upstream side of the propeller (39). The secondary pressure relief unit (77) includes a ring-shaped support member (69) fixed on an inner wall surface of the housing (35); a cone disc (71) for opening and closing the support member (69); a hollow sliding shaft (71*a*) fixed at a central portion of the cone disc (71); a disc support shaft (73*a*) which is inserted in the sliding shaft (71*a*) and guides movement of the sliding shaft (71*a*); a fixing frame (73) for fixing the disc support shaft (73*a*); and a spring (75) positioned between the cone disc (71) and the fixing frame (73).

The secondary pressure relief unit (77) is a non-electric water control valve which is opened or closed depending on the magnitude of the water pressure. That is, the secondary pressure relief unit is opened if the pressure of the water flowing into the housing (35) is high, and is closed if the pressure is low.

In the case of FIG. 5, since the secondary pressure relief unit (77) is positioned on the upstream side of the propeller (39), load on the propeller and the electronic brake (47) may be alleviated by first lowering the water pressure by the secondary pressure relief unit in a case where the water with very high pressure flows in.

Figure 6:
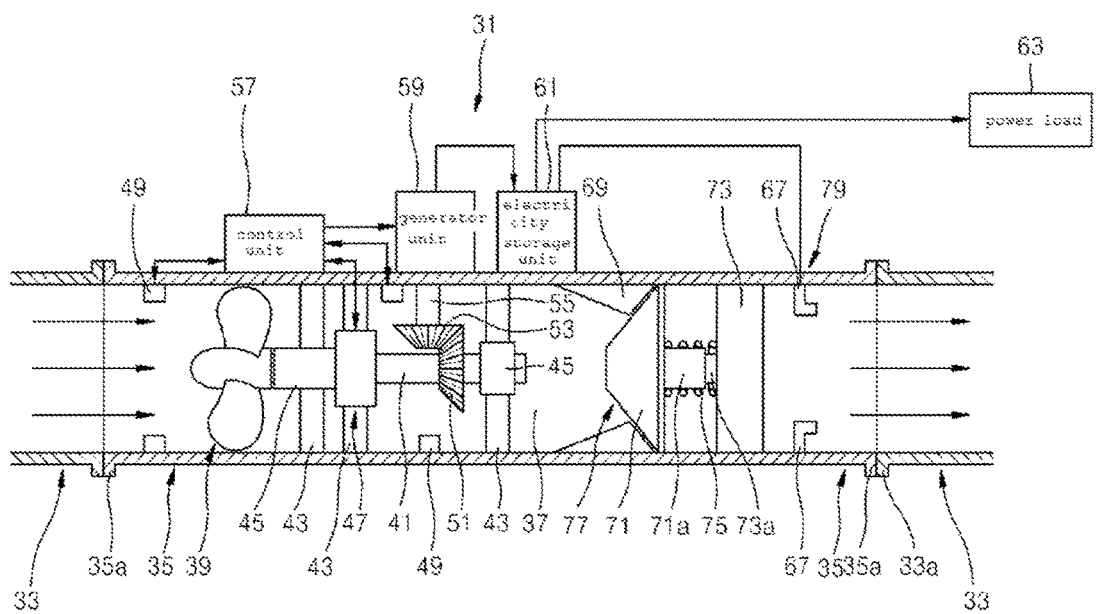
FIG. 6 is a view illustrating a generator-type pressure relief device for water supply and drainage pipes according to yet another embodiment of the present invention.

FIG. 6 is a view illustrating a generator-type pressure relief device for water supply and drainage pipes according to yet another embodiment of the present invention.

As illustrated, the secondary pressure relief unit (77) may be positioned disposed on the downstream side of the propeller (39). By disposing the secondary pressure relief unit (77) on the downstream side of the propeller (39) in such a manner, the water with its pressure changed after passing of the propeller (39) passes the secondary pressure relief unit (77), whereby the water pressure can be reduced once more.

As described above, although the present invention has been described through particular embodiments, the present invention is not limited to the particular embodiments, and various modifications may be made by those skilled in the art within the scope of technical concepts of the present invention.

Description of Reference Numerals

11: water supply pipe
13, 15: guide slope
17: rotor
19: blade
21: shaft
31: generator-type pressure relief device
33: water supply and drainage pipes
33*a*: flange part
35: housing
35*a*: flange part
37: flow path
39: propeller
41: shaft
43: frame
45: bearing
47: electronic brake
49: water pressure sensor
51: first bevel gear
53: second bevel gear
55: following shaft
57: control unit
59: generator unit
61: electricity storage unit
63: power load
65: electric water control valve
65*a*: valve body
65*b*: drive motor
65*c*: door
67: electrode
69: support member
71: cone disc
71*a*: sliding shaft
73: fixing frame
73*a*: disc support shaft
75: spring 77: secondary pressure relief unit
79: hydrotreater

The invention claimed is:

1. A generator-type pressure relief device for water supply and drainage pipes which reduces pressure of water flowing through a water supply pipe or a water drainage pipe and also generates electricity by using the water pressure comprising:
   a housing through which the water passing through the water supply pipe or the water drainage pipe passes;
   a propeller which is disposed in the housing and rotatable by the water pressure;
   a shaft which is fixed to a rotational center of the propeller and axially rotates when the propeller rotates;
   a bearing and a frame which axially rotatably support the shaft;
   a generator unit which generates the electricity by receiving rotational torque from the shaft;
   an electricity storage unit which stores the electricity generated by the generator unit;
   an electronic brake which is operated by electric signal supplied from the outside to suppresses an axial rotation of the shaft and which is submerged in the water and disposed in the housing while being supported by the frame;
   a control unit which sends an electric signal to the electronic brake to control operation of the electronic brake;
   a water pressure sensor which is provided in the water supply pipe or the water drainage pipe or the housing and which transmits information on the water pressure to the control unit to enable the control unit to control the electronic brake;
   a plurality of electrodes which are mounted in the housing and suppresses occurrence of scale in the water supply pipe or the water drainage pipe and prevents occurrence of red water and which are connected with the electricity storage unit to be supplied with electric current from the electricity storage unit and apply the supplied electric current to the water to activate electronic energy of molecules of the water passing through the housing; and
   a secondary pressure relief unit which is disposed on a upstream side or downstream side of the propeller and is opened or closed depending on the magnitude of the pressure of the water passing through the housing and which reduces the pressure of the water flowing toward the propeller or the pressure of the water which has passed the propeller,
   wherein the secondary pressure relief unit comprises: a ring-shaped support member fixed on an inner wall surface of the housing; a cone disc for opening and closing the support member; a hollow sliding shaft fixed at a central portion of the cone disc; a disc support shaft which is inserted in the sliding shaft and guides movement of the sliding shaft; a fixing frame for fixing the disc support shaft; and a spring positioned between the cone disc and the fixing frame.

2. The generator-type pressure relief device for water supply and drainage pipes according to claim 1, wherein the housing is a pipe-shaped member having the same inner diameter as that of the water supply pipe or the water drainage pipe, and both ends of the housing are fixed to the water supply pipe or the water drainage pipe.

3. The generator-type pressure relief device for water supply and drainage pipes according to claim 1, wherein the shaft is provided on a central axis of the housing and the shaft and the generator unit are power-connected through a first bevel gear and a second bevel gear meshing with each other.

* * * * *